Figure 1:
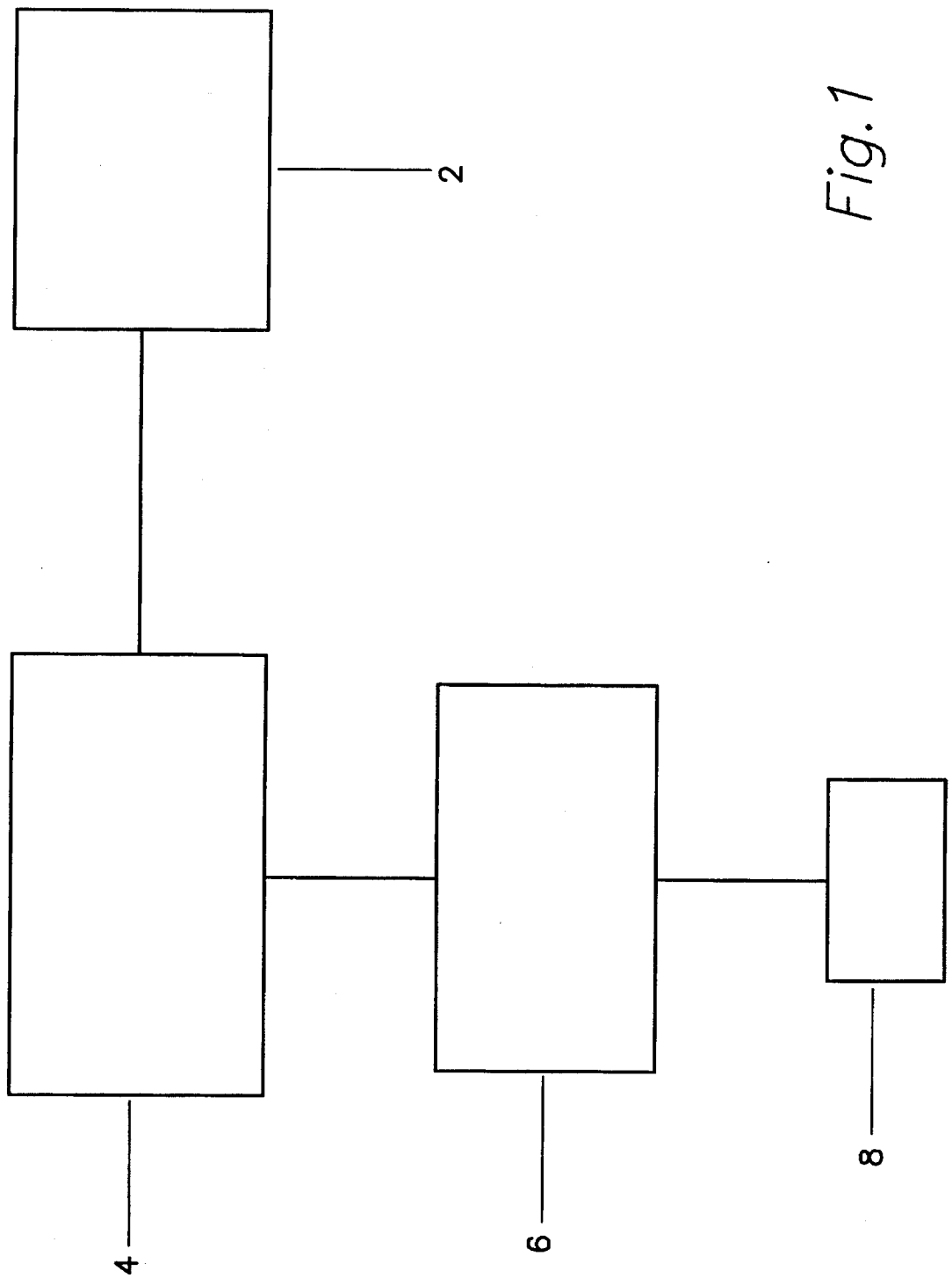

United States Patent [19]

Raufenbarth

[11] Patent Number: 5,460,328
[45] Date of Patent: Oct. 24, 1995

[54] METHOD FOR THE AUTOMATIC OPTIMIZATION OF A HEATING CURVE

[75] Inventor: Franz Raufenbarth, Schoenaich, Germany

[73] Assignee: Honeywell AG, Offenbach, Germany

[21] Appl. No.: 269,727

[22] Filed: Jul. 1, 1994

[30] Foreign Application Priority Data

Jul. 3, 1993 [EP] European Pat. Off. ............ 93110642
Sep. 6, 1993 [DE] Germany ........................ 43 30 063.4
Mar. 4, 1994 [DE] Germany ........................ 44 07 273

[51] Int. Cl.⁶ ............................................. F24F 7/00
[52] U.S. Cl. .................................... 237/2 R; 237/81
[58] Field of Search ........................ 237/2 R, 2 A, 237/81

[56] References Cited

U.S. PATENT DOCUMENTS 3,236,299 2/1966 Smith, Jr. ........................ 237/81 X
5,369,597 11/1994 Bujak, Jr. ...................... 237/2 R X Primary Examiner—William E. Tapolcai
Attorney, Agent, or Firm—Robert B. Leonard

[57] ABSTRACT

A method for the automatic optimization of the heating curve of a heating controller in a heating plant is devised, whereat the heating curve is approximated by the potential function $y = k \cdot x^{\alpha}$, in which function the coefficient k as well as the exponent $\alpha$ is evaluated in a simple manner. Furthermore, the influence of external energy may be taken into account.

10 Claims, 2 Drawing Sheets

METHOD FOR THE AUTOMATIC OPTIMIZATION OF A HEATING CURVE

The present invention relates to a method according to the preamble of the independent claims.

The present invention departs from the well-known relationship between the advance heating fluid temperature, the outside temperature, the room temperature and the nominal values of said values for the specific design example of the heating plant as well as the known values of m, which are characterizing the curvature of the heating curve. The following known relationship applies:

$$\theta_v - \theta_z = \frac{\theta_z - \theta_a}{\theta_{zn} - \theta_{an}} \cdot \frac{\theta_{vn} - \theta_{rn}}{1 - \left(\frac{\theta_{vn} - \theta_{zn}}{\theta_{rn} - \theta_{zn}}\right) \cdot \left[\left(\frac{\theta_z - \theta_a}{\theta_{zn} - \theta_{an}}\right)^{\frac{m-1}{m}}\right]} \quad (1)$$

wherein:

$\theta_z$=Room temperature
$\theta_a$=Outside temperature
$\theta_v$=Advance heating fluid temperature
$\theta_r$=Return heating fluid temperature
m=Exponent characteristic for the heater element 2
n=Index for the nominal values of the heating plant for the specific design.

If in the relationship of equation (1) the following substitutions are carried out:

$$\theta_v - \theta_z = y; \quad \theta_{vn} - \theta_{zn} = y_n$$

$$\theta_z - \theta_a = x; \quad \theta_{zn} - \theta_{an} = x_n$$

then equation (1) can be rewritten in the following form:

$$y = \frac{x}{x_n} \cdot \frac{\theta_{vn} - \theta_{rn}}{1 - \left(\frac{y_n}{\theta_{rn} - \theta_{zn}}\right) \cdot \left[\left(\frac{x}{x_n}\right)^{\frac{m-1}{m}}\right]} \quad (2)$$

In this equation (2) x is the only variable in the denominator as long as m=constant, which is practically the case anyway since m is determined by the used heater element 2 of the corresponding heater circuit 4 wherein the configuration performing the method of the present invention is seen in FIG. 1.

All heating curves for the layout of a heating plant and the corresponding heating circuit 4 can be characterized by means of equation (2). However, this mathematical relationship is so complex that its solution even with the use of a microprocessor 6 would be too cumbersome considering the need for high memory capacity and calculation time.

According to German patent 33 00 082, a plurality of heating curves are characterized according to equation (2) for defined values of $x_n$, $\theta_{vn}$, $\theta_{rn}$, $\theta_{an}$, m according to the following relationship:

$$Y_i = S \cdot f_i(x) \quad (3)$$

whereby $f_i$ is determined in such a way that equation (2) is satisfied with good approximation in the prescribed temperature range by using polynomials. The index i (i=1, 2 ... n) defines the various heating curves that form the family of heating curves, whereby S is the slope of the heating curve and the function $f_i(x)$ represents the curvature of the normalized heating curve.

With this known technique there is either a change made in the slope or a change is made in the curvature of the heating curve.

A much faster convergence of the optimization method is achieved according to German patent 32 10 428 in which the heating curve is prescribed by means of the following equation:

$$y = \sum_{j=1}^{M} k_j \cdot x^{\alpha j}. \quad (4)$$

Instantaneous values of $\theta_a$, $\theta_v$, and $\theta_z$ which are determined at various points of time are used to compute the parameter k by means of a statistical regression method. In this prior art method the exponent(s) $\alpha j$ is (are) assumed to be constant(s).

Starting from this prior art it is the object of the present invention to improve the known method to achieve a rapid convergence of the optimization of the heating curve without the application of a statistical regression method.

A solution of this object is achieved according to the characterizing features of claim 1.

This invention departs from the fact that at a desired room temperature of e.g. $\theta_z$=20° C. and with an outside temperature of e.g. $\theta_a$=20° C. the advance temperature $\theta_v$ of the heating fluid also has to be 20° C. This means the heating curve is crossing the origin of the coordinates. Due to external energy sources as e.g. sun or wind influences, the heating curve actually may be displaced into one or the other direction. With this respect it is e.g. known to provide a sun sensor and to switch its signal to the controller for the advance fluid temperature. The influence of the energy of the sun may be taken into account by a service input at the operational panel of the controller. In a similar manner, but with the reverse sign, the influence of wind may be taken into account. Methods which can take into account such an external energy without the provision of particular sensors 8 are not known this far.

It is therefor a further object of the present invention to design the above-indicated method in such a way that also external energy influencing the building may be taken into account during the optimization of the heating curve.

A solution of this object is achieved according to the characterizing features of independent claim 2. Further advantageous embodiments of the inventive methods may be taken from the depending claims.

The inventive methods shall be discussed with the help of the enclosed figures.

Figure 2:
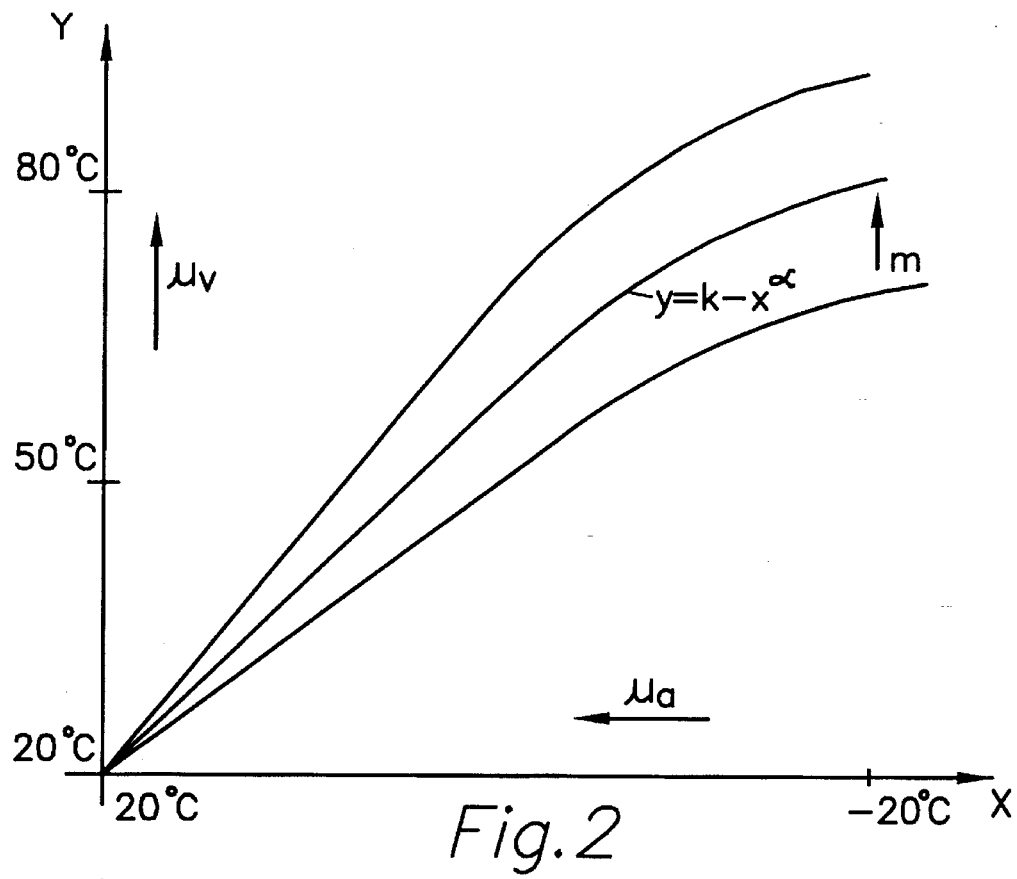
Figure 3:
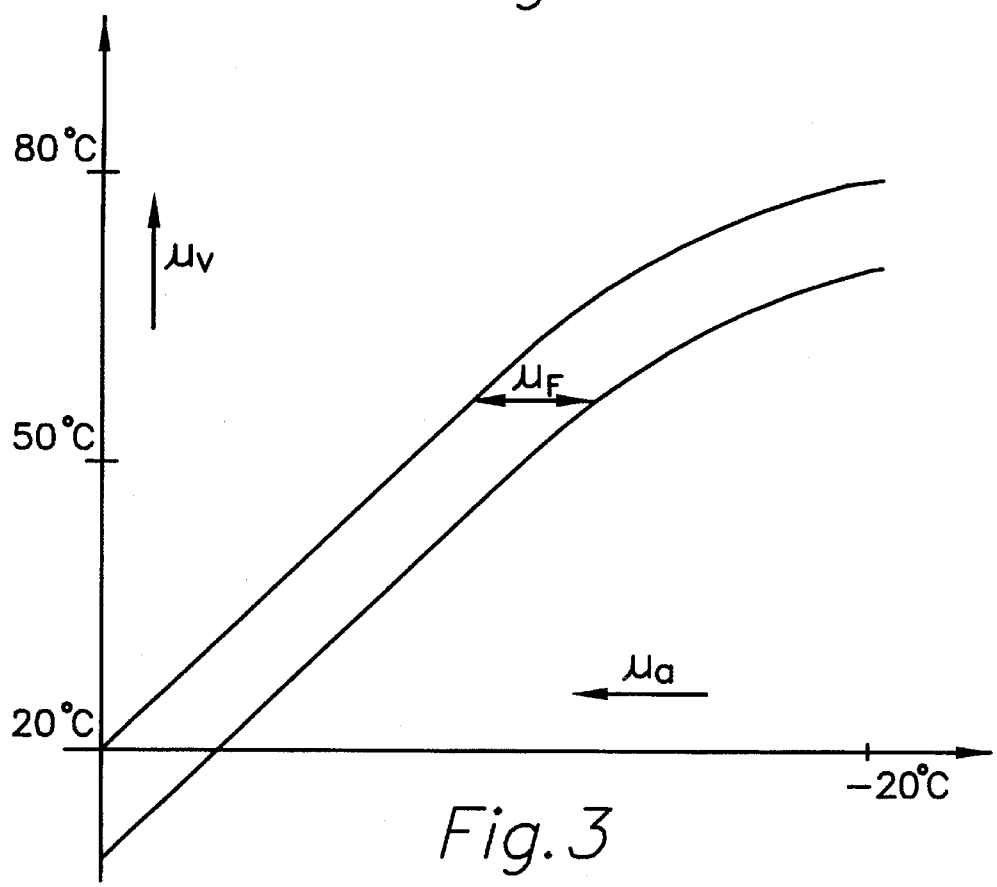

In FIG. 2 the value y or the advance fluid temperature $\theta_v$ is plotted as a function of the value x or the outside temperature $\theta_a$, respectively, whereas FIG. 3 is showing the displacement $\theta_F$ which the same heating curve experiences due to the external energy.

Hereby it is obvious that e.g. by solar radiation the heating curve is displaced to lower values, whereas by means of wind influences a displacement to higher values occurs. Other external energy sources within a building in the same way may be taken into account by the optimization of the heating curve.

For various heater element 2 exponents m various curvature trajectories are obtained resembling potential functions. Each of the curves can be described by means of a potential function:

$$y = k \cdot x^\alpha \quad (5).$$

In this potential function the coefficient k and the exponent $\alpha$ can be computed in a known fashion using the known expressions:

$$\alpha = \frac{\Sigma(\ln x_i)(\ln y_i) - \frac{(\Sigma \ln x_i)(\Sigma \ln y_i)}{n}}{\Sigma(\ln x_i)^2 - \frac{(\Sigma \ln x_i)^2}{n}} \quad (6)$$

$$k = \exp\left[\frac{\Sigma \ln y_i}{n} - \alpha \frac{\Sigma \ln x_i}{n}\right]. \quad (7)$$

If $\alpha$ and $k$ are determined for two sets of measurements, $x_1, x_2$ and $y_1, y_2$, this means if the serial development is interrupted after the second term, then one obtains:

$$\alpha = \frac{\ln \frac{y_1}{y_2}}{\ln \frac{x_1}{x_2}} \quad (8)$$

and $$k = \sqrt{\frac{y_1 \cdot y_2}{(x_1 \cdot x_2)^\alpha}} \quad (9)$$

One obtains the same results by taking two equations based on equation (5):

$$y_1 = k \cdot x_1^\alpha$$

$$y_2 = k \cdot x_2^\alpha$$

Taking the logarithms of both equations:

$$\ln y_1 = \ln k + \alpha \ln x_1$$

$$\ln y_2 = \ln k + \alpha \ln x_2$$

Subtracting both equations:

$$\ln y_1 - \ln y_2 = \alpha \ln x_1 - \alpha \ln x_2 \quad (8')$$

$$\ln \frac{y_1}{y_2} = \alpha \left(\ln \frac{x_1}{x_2}\right)$$

$$\alpha = \frac{\ln \frac{y_1}{y_2}}{\ln \frac{x_1}{x_2}}$$

In a similar manner one derives from the starting equations:

$$k = \frac{y_1}{x_1^\alpha}, \text{ respectively, } k = \frac{y_2}{x_2^\alpha},$$

and equation (9) by forming the geometric means of the last two equations.

If one determines $k$ and $\alpha$ from a triplet of measurements of $\theta_z$, $\theta_a$ and $\theta_v$, which are representatives of mid-winter outside temperature ranges and if one forms the mean value of the obtained coefficients $k$ and the exponents $\alpha$, then one obtains in a simple manner and with little computation an optimized heating curve according to the potential functions of equation (5).

The process of optimizations always starts with a start-up heating curve. Even for the case of a way-off condition, it can be shown with assurance that the correct heating curve will be determined. In order to avoid unnecessary loading of the computation values of $\alpha$ smaller than 0,6 are not being considered.

In the above-indicated equations it was necessary to take the algorithm of certain values in order to calculate the value of the exponent $\alpha$. This logarithmation can be avoided in the following way:

The potential function (5) approximating the equation of the heating curve is differentiated:

$$y' = \alpha \cdot k \cdot x^{\alpha-1} \quad (10).$$

Now the ratio is formed:

$$\frac{y}{y'} = \frac{k \cdot x^\alpha}{\alpha \cdot k \cdot x^{\alpha-1}} = \frac{x}{\alpha} \quad (11)$$

or $$\alpha = x \cdot \frac{y'}{y}$$

If one substitutes in equation (11) for:

$$y' = \frac{dy}{dx} \approx \frac{\Delta y}{\Delta x} = \frac{y_1 - y_2}{x_1 - x_2}.$$

and inserts for $x$ and $y$ the arithmetic mean $$x = \frac{x_1 + x_2}{2}, y = \frac{y_1 + y_2}{2},$$

then one obtains:

$$\alpha = \frac{x_1 + x_2}{x_1 - x_2} \cdot \frac{y_1 - y_2}{y_1 + y_2} \quad (12)$$

and $$k = \frac{y_1 + y_2}{2\left(\frac{x_1 + x_2}{2}\right)^\alpha}. \quad (13)$$

By the mere insertion of two data triplets $x_1, x_2$ and $y_1, y_2$ one can show that the equations (12) and (13) represent good approximations to the exact equations (8) and (9) before. The data differences $x_1 = \theta_{z1} - \theta_{a1}$ and $x_2 = \theta_{a2}$ should be separated preferentially by less than 5 Kelvin. The measurements should be made at outside temperatures of <10° C. The accuracy of the technique can be enhanced through repeated taking of data triplets and averaging of the results for $k$ and $\alpha$.

According to the further embodiment of the present invention, the heating curve equation is given by the following approximate function:

$$y = k(x \mp \theta_F)^\alpha \quad (14),$$

whereat in a known manner $y = \theta_v - \theta_z$ and $x = \theta_z - \theta_a$ with $\theta_v$=advance temperature of the heating fluid $\theta_z$=room temperature, and $\theta_a$=outside temperature, and whereat $\theta_F$ represents the temperature displacement due to the available external energy (positive or negative). Within the subsequent equations it is departed from the fact that a positive external energy is present so that the minus sign in front of $\theta_F$ within equation (14) is valid.

By differentiation of the above-indicated equation along x one receives:

$$y' = \frac{dy}{dx} = \alpha \cdot k(x - \theta_F)^{\alpha-1} \qquad (10)$$

If one divides both preceding equations, then one receives:

$$\frac{y}{y'} = \frac{x - \theta_F}{\alpha} \qquad (15)$$

or $$\alpha \frac{y}{y'} + \theta_F = x.$$

The equation (15) is a linear equation with respect to $\alpha$ and $\theta_F$.

Now it is set:

$$y = \frac{y_1 + y_2}{2} \ ; \ x = \frac{x_1 + x_2}{2} \ ; \ y' = \frac{y_2 - y_1}{x_2 - x_1}$$

Inserted into equation (15) one receives:

$$\alpha \cdot \frac{y_1 + y_2}{y_2 - y_1} \cdot (x_2 - x_1) + 2\theta_F = x_1 + x_2$$

Also this is a linear equation with respect to $\alpha$ and $\theta_F$. By taking a further pair of measuring points $x_3$, $y_3$ one then receives two equations for the evaluation of $\alpha$ and $\theta_F$:

$$\frac{y_1 + y_2}{y_2 - y_1} \cdot (x_2 - x_1)\alpha + 2\theta_F = x_1 + x_2 \qquad (16)$$

$$\frac{y_2 + y_3}{y_3 - y_2} \cdot (x_3 - x_2)\alpha + 2\theta_F = x_2 + x_3$$

A further pair of equations could be given in the following way:

$$\frac{y_2 + y_3}{y_3 - y_2} \cdot (x_3 - x_2)\alpha + 2\theta_F = x_2 + x_3 \qquad (17)$$

$$\frac{y_3 + y_4}{y_4 - y_3} \cdot (x_4 - x_3)\alpha + 2\theta_F = x_3 + x_4$$

If one makes the following substitutions:

$$a_{11} = \frac{y_n + y_{n+1}}{y_{n+1} - y_n} (x_{n+1} - x_n) \quad a_{12} = 2 \quad b_1 = x_n + x_{n+1}$$

$$a_{21} = \frac{y_{n+1} + y_{n+2}}{y_{n+2} - y_{n+1}} (x_{n+2} - x_{n+1}) \quad a_{22} = 2 \quad b_2 = x_{n+1} + x_{n+2}$$

Then follows: (18)

$$\alpha_n = \frac{\begin{vmatrix} b1 & a12 \\ b2 & a22 \end{vmatrix}}{\begin{vmatrix} a11 & a12 \\ a21 & a22 \end{vmatrix}} \qquad (18)$$

$$\theta_{Fn} = \frac{\begin{vmatrix} a11 & b1 \\ a21 & b2 \end{vmatrix}}{\begin{vmatrix} a11 & a12 \\ a21 & a22 \end{vmatrix}} \qquad (19)$$

By forming the average value of as much as possible $\alpha_n$ and $\theta_{Fn}$ it results:

$$\bar{a} = \frac{1}{n} \sum_n \alpha_n \qquad (20)$$

$$\bar{\theta}_F = \frac{1}{n} \sum_n \theta_{Fn}. \qquad (21)$$

From equation (14) one then receives k as follows:

$$\bar{k} = \sqrt[n]{\left[ \frac{y_1 \cdot y_2 \ldots y_n}{(x_1 - \theta_F)(x_2 - \theta_F) \ldots (x_n - \theta_F)} \right]^\alpha} \qquad (22)$$

or $$\overline{\ln k} = \frac{1}{n} \left[ \sum_n \ln y_n - \sum_n \ln(x_n - \theta_F) \right].$$

Besides this calculation example for the evaluation of k, $\alpha$ and $\theta_F$ there exist further possibilities for calculating those values from different triplets of measured values $\theta_v$, $\theta_z$ and $\theta_a$, i.e. from different $y_n$ and $x_n$. The distances between the measurements herewith may vary to a great extent.

Summarizing it is to note that according to the present invention the heating curve equation is approximated by an exponential function having three parameters k, $\alpha$ and $\theta_F$ and that by means of simple linear equations with respect to $\alpha$ and $\theta_F$ all parameters may be calculated in a simple manner.

I claim:

1. A method for automatic optimization of the heating curve of a heating controller in a heating plant of a building, at which the outside temperature $\theta_a$, the advance heating temperature $\theta_v$ or another value of the heating fluid representing the potential heating capability within the heating circuit and the room temperature $\theta_z$ of a room heated by the heating circuit or an average value of the room temperatures of a plurality of the rooms of the heated building are measured, and the heating controller is guiding the advance heating fluid temperature $\theta_v$ as a function of the outside temperature $\theta_a$ and the set value of the room temperature according to the heating curve, and whereat the heating curve is approximated by a heating curve equation of the form $y = k \cdot x^\alpha$, whereat $y = \theta_v - \theta_z$ and $x = \theta_z - \theta_a$, characterized in that within the heating curve equation the coefficient k as well as the exponent $\alpha$ are determined by computation by a microprocessor connected to the heating circuit wherein the measured values $\theta_a$, $\theta_v$, $\theta_z$ are sent to the microprocessor from the heating circuit.

2. A method for automatic optimization of the heating curve of a heating controller in a heating plant of a building, at which the outside temperature $\theta_a$, the advance heating temperature $\theta_v$ or another value of the heating fluid representing the potential heating capability within the heating circuit and the room temperature $\theta_z$ of a room heated by the heating circuit or an average value of the room temperatures of a plurality of the rooms of the heated building are measured, and the heating controller is guiding the advance heating temperature $\theta_v$ as a function of the outside temperature $\theta_a$ and the set value of the room temperature according to the heating curve, and whereat the heating curve is approximated by a heating curve equation of the form $y=k \cdot x^\alpha$, whereat y is provided by the difference between the advance fluid temperature $\theta_v$ and the room temperature $\theta_z$, and x contains the difference between the room temperature $\theta_z$ and the outside temperature $\theta_a$, characterized in that within the heat curve equation the coefficient k as well as the exponent $\alpha$ are calculated with a microprocessor from measured values $\theta_a$, $\theta_v$, $\theta_z$ by a microprocessor connected to the heating circuit and that the variable x furthermore contains a temperature $\theta_F$ resulting from an external energy according to the following relationship:

$$x' = \theta_z - \theta_a \mp \theta_F.$$

3. Method according to claim 1, characterized in that the variables $\alpha$, $\theta_F$ and k are evaluated by the microprocessor from the following equations:

$$\frac{y_n + y_{n+1}}{y_n - y_{n+1}} (x_n - x_{n+1})\alpha + 2\theta_F = x_n + x_{n+1}$$

$$\overline{\ln K} = \frac{1}{n}\left[\sum_n \ln y_n - \alpha \sum_n \ln(x_n - \theta_F)\right],$$

whereat n=1, 2, 3 ..., i.e. measurements at different points of time.

4. Method according to claim 1, characterized in that the coefficient k as well as the exponent $\alpha$ are determined by the microprocessor from $\theta_a$, $\theta_v$, $\theta_z$ and subsequently the average value is determined by the microprocessor.

5. Method according claim 4, characterized in that the exponent $\alpha$ is calculated according to the following relationship:

$$\alpha = \frac{\ln \frac{y_1}{y_2}}{\ln \frac{x_1}{x_2}}$$

and the coefficient k is calculated according to the following relationship:

$$k = \sqrt{\frac{y_1 \cdot y_2}{(x_1 \cdot x_2)^\alpha}},$$

whereat $x_1$, $y_2$ and $x_2$, $y_2$ are given by $\theta_a$, $\theta_v$, $\theta_z$ wherein $\theta_a$, $\theta_v$, $\theta_z$ are sent from the heating circuit to a microprocessor connected to the heating circuit and the calculations for k and $\alpha$ are then performed by the microprocessor.

6. Method according to claim 4, characterized in that values of $\alpha < 0,6$ are disregarded.

7. Method according to claim 1, characterized in that the exponent $\alpha$ is calculated according to the following relationship:

$$\alpha = \frac{x_1 + x_2}{x_1 - x_2} \cdot \frac{y_1 - y_2}{y_1 + y_2}$$

and the coefficient k is calculated according to the following relationship:

$$k = \frac{y_1 + y_2}{2\left(\frac{x_1 + x_2}{2}\right)^\alpha}$$

whereby $x_1$, $y_1$ and $x_2$, $y_2$ are given by measured values wherein the calculations for k and $\alpha$ are performed by the microprocessor.

8. Method according to claim 7, characterized in that the differences between the measured values $x_1$, $x_2$ are separated by less than 5 Kelvin.

9. A method for automatic optimization of the heating curve of a a heating controller in a heating plant of a building comprising the steps of:

measuring the outside temperature $\theta_a$ with a sensor mechanism;

measuring the room temperature $\theta_z$ with the sensor mechanism;

determining, with a microprocessor connected to a heating circuit, k and $\alpha$ from the equation $y=k \cdot x^\alpha$ wherein $y=\theta_v-\theta_z$ and $x=\theta_z-\theta_a$ wherein $\theta_v$ is a temperature representing the potential heating capability within the heating circuit;

creating an optimized heating curve with the values k and $\alpha$; and guiding the advanced heating temperature $\theta_v$ with a heating circuit according to the optimized heating curve based on a function of the outside temperature $\theta_a$ and a set value of the room temperature $\theta_z$ to optimize heating in a building.

10. The method of claim 9 wherein the value x further comprises a displacement temperature $\theta_F$ due to external energy resulting in $x=\theta_z-\theta_a \mp \theta_F$.

* * * * *